United States Patent
Lee

(10) Patent No.: US 8,130,873 B2
(45) Date of Patent: Mar. 6, 2012

(54) CARRIER RECOVERY APPARATUS USABLE WITH VSB TYPE RECEIVER AND METHOD THEREOF

(75) Inventor: Dong-hoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1543 days.

(21) Appl. No.: 11/199,077

(22) Filed: Aug. 9, 2005

(65) Prior Publication Data

US 2006/0045209 A1    Mar. 2, 2006

(30) Foreign Application Priority Data

Aug. 27, 2004 (KR) .................... 10-2004-0067707

(51) Int. Cl.
*H03D 1/24* (2006.01)

(52) U.S. Cl. ........ 375/321; 375/326; 375/301; 375/270; 375/373; 455/204; 455/47; 348/726; 348/725

(58) Field of Classification Search .................. 375/326, 375/321, 301, 270, 373; 455/204, 47; 348/726, 348/725
See application file for complete search history.

(56) References Cited

U.S. PATENT DOCUMENTS

| | | | |
|---|---|---|---|
| 3,068,416 A | 2/1957 | Meyer | |
| 3,959,726 A * | 5/1976 | Hinoshita et al. | 375/293 |
| 5,802,461 A * | 9/1998 | Gatherer | 455/204 |
| 5,805,242 A * | 9/1998 | Strolle et al. | 348/726 |
| 5,809,088 A * | 9/1998 | Han | 375/344 |
| 5,999,223 A * | 12/1999 | Patel et al. | 348/555 |
| 6,198,780 B1 * | 3/2001 | Kang | 375/321 |
| 6,275,548 B1 * | 8/2001 | Wolf et al. | 375/355 |
| 6,430,234 B1 * | 8/2002 | Perlow | 375/321 |
| 6,577,685 B1 | 6/2003 | Bao et al. | |
| 6,583,822 B1 | 6/2003 | Jun | |
| 6,671,339 B1 * | 12/2003 | Ahn | 375/346 |
| 6,707,861 B1 * | 3/2004 | Stewart | 375/321 |
| 6,771,714 B2 * | 8/2004 | Liu et al. | 375/326 |
| 6,882,373 B2 * | 4/2005 | Hong et al. | 348/726 |
| 7,061,996 B2 * | 6/2006 | Kim | 375/321 |
| 7,342,981 B2 * | 3/2008 | Wongwirawat et al. | 375/326 |

(Continued)

FOREIGN PATENT DOCUMENTS

CN     1238612     12/1999

(Continued)

OTHER PUBLICATIONS

Japanese Office Action on Feb. 5, 2008 issued in JP 2005-244921.

(Continued)

*Primary Examiner* — Kenneth Lam
(74) *Attorney, Agent, or Firm* — Stanzione & Kim, LLP

(57) ABSTRACT

A carrier recovery apparatus usable with a VSB receiver and a method thereof. The carrier recovery apparatus is capable of recovering a carrier even though a pilot signal may be corrupted due to multi-path characteristics of a channel. Accordingly, the carrier recovery apparatus performs a BECM (Band Edge Component Maximization) algorithm on upper and lower sidebands of a received signal to generate phase information therefrom. The phase information is combined in a combiner. Since the BECM algorithm is performed on the upper and lower sidebands, it is possible to execute the carrier recovery even through the upper sideband of a received signal may be corrupted. Therefore, the carrier recovery apparatus can prevent performance degradation of the VSB receiver caused by corruption in the pilot signal.

8 Claims, 6 Drawing Sheets

U.S. PATENT DOCUMENTS

| | | | |
|---|---|---|---|
| 7,643,577 B2 * | 1/2010 | Lee | 375/321 |
| 2002/0033902 A1 * | 3/2002 | Choi | 348/731 |
| 2003/0206053 A1 * | 11/2003 | Xia et al. | 329/323 |
| 2004/0136474 A1 * | 7/2004 | Hwang | 375/326 |
| 2004/0150754 A1 * | 8/2004 | Jun | 348/607 |
| 2006/0045210 A1 * | 3/2006 | Lee | 375/326 |
| 2006/0078071 A1 * | 4/2006 | Lee | 375/326 |

FOREIGN PATENT DOCUMENTS

| | | |
|---|---|---|
| JP | 09-162934 | 6/1997 |
| JP | 11-136301 | 5/1999 |
| KR | 2001-63060 A | 7/2001 |
| KR | 2002-12399 A | 2/2002 |
| KR | 2002-65745 A | 8/2002 |
| WO | 03088509 A2 | 10/2003 |
| WO | WO 03/088512 | 10/2003 |

OTHER PUBLICATIONS

Chinese Search Report issued Dec. 5, 2008 in CN Application No. 200510093585.7.

Chinese Office Action issued Jan. 8, 2010 in CN Application No. 2005100935857.

European Search Report, Feb. 15, 2006.

Dominique N. Godard, Passband Timing Recovery in an All-Digital Modem Receiver, IEEE Transactions on Communications, vol. 26, No. 5, May 1978, pp. 517-523.

* cited by examiner

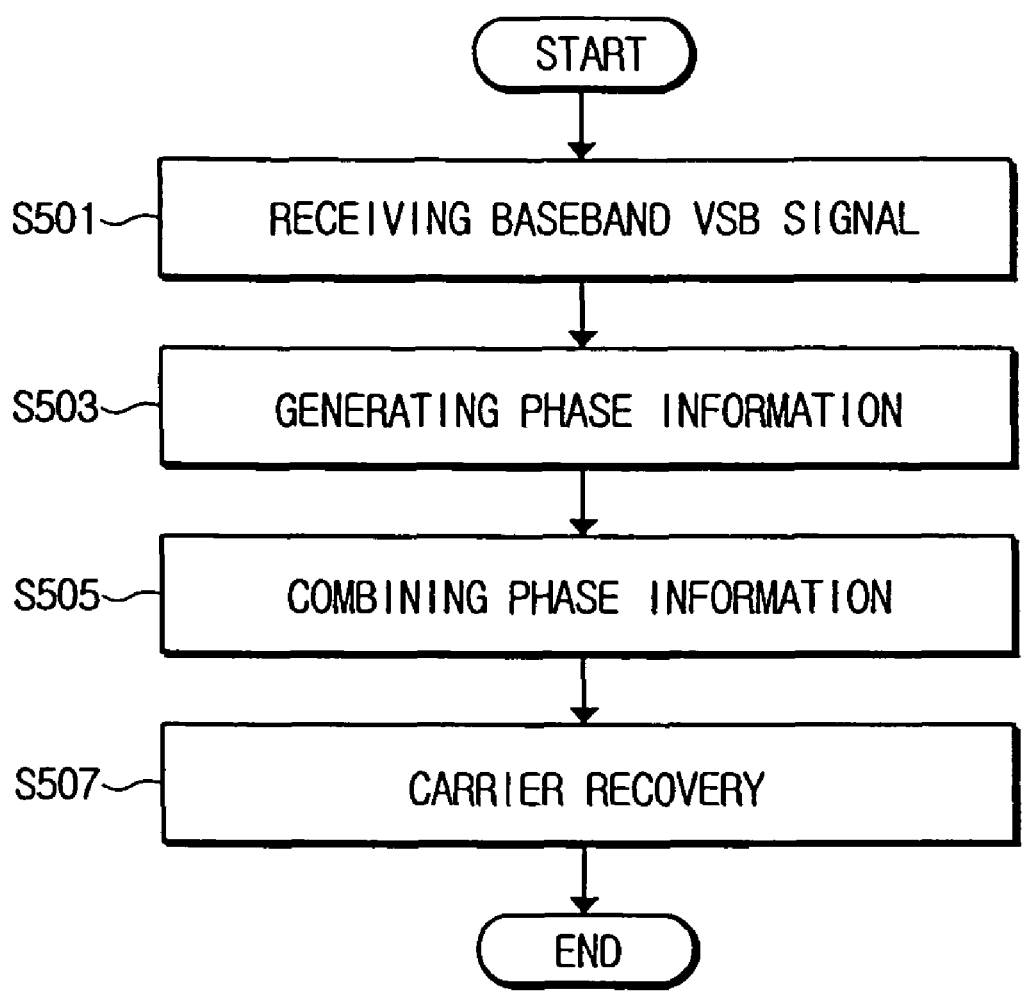

US 8,130,873 B2

CARRIER RECOVERY APPARATUS USABLE WITH VSB TYPE RECEIVER AND METHOD THEREOF

CROSS-REFERENCE TO RELATED APPLICATIONS

This application claims benefit under 35 U.S.C. §119 from Korean Patent Application No. 2004-67707, filed on Aug. 27, 2004, the content of which is incorporated herein, its entirety by reference.

BACKGROUND OF THE INVENTION

1. Field of the Invention

The present general inventive concept relates to a carrier recovery apparatus usable with a vestigial side band (VSB) receiver and a method thereof. More specifically, the present general inventive concept relates to a carrier recovery apparatus using not only a pilot signal, but also upper and lower sidebands of a received VSB signal, and a method thereof.

2. Description of the Related Art

In order for a data receiver to accurately demodulate VSB-modulated data, it is necessary to minimize frequency offset and high levels of phase noise (jitter) generated from a tuner or an RF (radio frequency) oscillator used for data receiving. This procedure is called 'carrier recovery'.

A digital broadcast system based on a VSB modulation method in conformity with the standards of the Advanced Television Systems Committee (ATSC) uses a pilot signal in a transmitting signal for carrier synchronization. Here, the pilot signal is a signal loaded on a carrier during the transmission for accurate carrier recovery.

FIG. 1 is a block diagram illustrating a conventional carrier recovery circuit 100 for phase detection. Referring to FIG. 1, the conventional carrier recovery circuit 100 comprises a multiplier 101, a pilot detector 103, a phase detector 105, a loop filter 107, and a numerically controlled oscillator (NCO) 109.

A received VSB signal is digitalized by an analog-to-digital converter (ADC) (not shown), and output as a baseband signal by the multiplier 101.

The pilot detector 103 detects a pilot signal from the baseband signal, and the phase detector 105 reads phase information of the pilot signal. There are many methods for reading phase information of the pilot signal, and a suitable method is selected depending on the application. The phase information read by the phase detector 105 goes through the loop filter 107, is converted to a frequency component through the NCO 109, and is multiplied with the received VSB signal by the multiplier 101 to output the baseband signal.

The above-described procedure is repeatedly performed according to a feedback operation until a phase error of the pilot signal becomes zero.

However, if the pilot signal in the wireless environment is corrupted, a received signal cannot be recovered properly. The unwanted pilot signal corruption occurs often in a multi-path environment, and eventually causes performance degradation of the VSB receiver. This problem can occur in any American digital broadcasting system using the VSB method.

SUMMARY OF THE INVENTION

Accordingly, the present general inventive concept provides a carrier recovery apparatus usable with a vestigial side band (VSB) receiver and a method thereof, in which carrier recovery can be achieved through a received signal irrespective of complete corruption of a pilot signal.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a carrier recovery apparatus usable with a VSB receiver, the apparatus comprising a multiplier to receive a VSB-modulated digital signal and to multiply the received VSB-modulated digital signal by a carrier signal of a predetermined frequency to generate a baseband VSB signal, a spectrum inverter to invert upper and lower sidebands of the baseband VSB signal to invert a spectrum thereof, a lower BECM unit to perform a BECM (Band Edge Component Maximization) algorithm on the spectrum inverted signal to generate lower phase information based on a difference between phase information of the inverted baseband VSB signal and first predetermined reference phase information, a loop filter to filter a low-band signal from the lower phase information, and an NCO (Numerically Controlled Oscillator) to correct a frequency offset of the carrier signal and output the frequency offset-corrected carrier signal to the multiplier under the control of the low-band signal.

The spectrum inverter may detect and remove a pilot signal contained in the baseband VSB signal before inverting the upper and lower sidebands of the baseband VSB signal.

The apparatus may further comprise an upper BECM unit to perform the BECM algorithm directly on the baseband VSB signal to generate upper phase information based on a difference between phase information of the baseband VSB signal and second predetermined reference phase information, and a combiner to multiply the upper and the lower phase information by first and second predetermined weights, respectively and to output a sum of the multiplication results as final phase information to the loop filter.

The first and second predetermined weights may vary depending on reliabilities of the upper and the lower phase information, respectively, with respect to different channel characteristics.

The apparatus may further comprises a pilot detector to detect the pilot signal contained in the baseband VSB signal, a phase detector to detect pilot phase information from the detected pilot signal, and a combiner to multiply the lower and the pilot phase information by first and second predetermined weights, respectively, and to output a sum of the multiplication results as final phase information to the loop filter.

The first and second predetermined weights may vary depending on reliabilities of the lower and the pilot phase information, respectively, with respect to different channel characteristics.

The spectrum inverter may receive the pilot signal from the pilot detector and may detect and remove the pilot signal contained in the VSB signal before inverting the upper and lower sidebands of the baseband VSB signal.

The VSB-modulated signal may be a digital broadcast signal, conforming with standards of ATSC (Advanced Television System Committee).

The foregoing and/or other aspects of the present general inventive concept may also be achieved by providing a carrier recovery apparatus usable with a VSB receiver, the apparatus comprising a multiplier to receive a VSB-modulated digital signal and to multiply the received VSB-modulated digital signal by a carrier signal of a predetermined frequency to generate a baseband VSB signal, an upper BECM unit to perform a BECM (Band Edge Component Maximization)

algorithm on the baseband VSB signal to generate upper phase information based on a difference between phase information of the baseband VSB signal and predetermined reference phase information, a loop filter to filter a low-band signal from the upper phase information, and an NCO to correct a frequency offset of the carrier signal and output the frequency offset-corrected carrier signal to the multiplier under the control of the low-band signal.

The foregoing and/or other aspects of the present general inventive concept may also be achieved by providing a carrier recovery apparatus usable with a VSB receiver, the apparatus comprising a multiplier to receive a VSB-modulated digital signal containing a pilot signal, to multiply the received VSB-modulated digital signal by a carrier signal of a predetermined frequency to generate a baseband VSB signal, an upper BECM unit to perform a BECM (Band Edge Component Maximization) algorithm on the baseband VSB signal to generate upper phase information based on a difference between phase information of the baseband VSB signal and predetermined reference phase information, a pilot detector to detect the pilot signal from the baseband VSB signal, a phase detector to detect pilot phase information from the detected pilot signal, a combiner to multiply the upper and the pilot phase information by first and second predetermined weights, respectively, and to add the multiplication results to generate final phase information, a loop filter to filter a low-band signal from the final phase information, and an NCO to correct a frequency offset of the carrier signal and output the frequency offset-corrected carrier signal to the multiplier under the control of the low-band signal.

A receiver to receive a VSB-modulated signal and provided with the carrier recovery apparatus described above may recover a carrier of the received VSB-modulated signal.

The foregoing and/or other aspects of the present general inventive concept may also be achieved by providing a carrier recovery method, the method including receiving a VSB-modulated digital signal and multiplying the received VSB-modulated digital signal by a carrier signal of a predetermined frequency to generate a baseband VSB signal, inverting upper and lower sidebands of the baseband VSB signal to invert a spectrum thereof, performing a BECM (Band Edge Component Maximization) algorithm on the spectrum inverted signal to generate lower phase information based on a difference between phase information of the inverted baseband VSB signal and first predetermined reference phase information, and correcting a frequency offset of the carrier signal according to the generated lower phase information.

Before the inverting of the upper and lower sidebands of the baseband VSB signal, a pilot signal may be detected and removed from the VSB signal.

The method may further include performing the BECM algorithm directly on the baseband VSB signal to generate upper phase information based on a difference between phase information of the baseband VSB signal and second predetermined reference phase information, and before the correcting of the frequency offset, multiplying the upper and the lower phase information by first and second predetermined weights, respectively, and adding the multiplication results to generate final phase information.

The first and second predetermined weights may vary depending on reliabilities of the upper and the lower phase information, respectively, with respect to different channel characteristics.

The method may further include during the generating of the baseband VSB signal, detecting the pilot signal contained in the baseband VSB signal, detecting pilot phase information from the detected pilot signal, and before the correcting of frequency offset, multiplying the lower and the pilot phase information by first and second predetermined weights, respectively, and adding the multiplication results to generate final phase information.

The first and second predetermined weights may vary depending on reliabilities of the lower and the pilot phase information, respectively, with respect to different channel characteristics.

Before the inverting of the upper and lower sidebands of the baseband VSB signal, the pilot signal may be detected and removed from the baseband VSB signal.

The VSB-modulated signal may be a digital broadcast signal, conforming with standards of ATSC (Advanced Television System Committee).

The foregoing and/or other aspects of the present general inventive concept may also be achieved by providing a carrier recovery method usable with a VSB receiver, the method comprising receiving a VSB-modulated digital signal and multiplying the received VSB-modulated digital signal by a carrier signal of a predetermined frequency to generate a baseband VSB signal, performing a BECM (Band Edge Component Maximization) algorithm on the baseband VSB signal to generate upper phase information based on a difference between phase information of the baseband VSB signal and predetermined reference phase information, and correcting a frequency offset of the carrier signal according to the generated upper phase information.

The foregoing and/or other aspects of the present general inventive concept are achieved by providing a carrier recovery method usable with a VSB receiver, the method comprising receiving a VSB-modulated digital signal and multiplying the received VSB-modulated digital signal by a carrier signal of a predetermined frequency to generate a baseband VSB signal, performing a BECM (Band Edge Component Maximization) algorithm on the baseband VSB signal to generate upper phase information based on a difference between phase information of the baseband VSB signal and predetermined reference phase information, detecting a pilot signal from the baseband VSB signal, detecting pilot phase information from the detected pilot signal, multiplying the upper and the pilot phase information by first and second predetermined weights, respectively, and adding the multiplication results to generate final phase information, and correcting a frequency offset of the carrier signal according to the final phase information.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 5 is a flow chart illustrating operations of a carrier recovery apparatus usable with a VSB receiver according to an embodiment of the present general inventive concept.

DETAILED DESCRIPTION OF THE PREFERRED EMBODIMENTS

Figure 1:
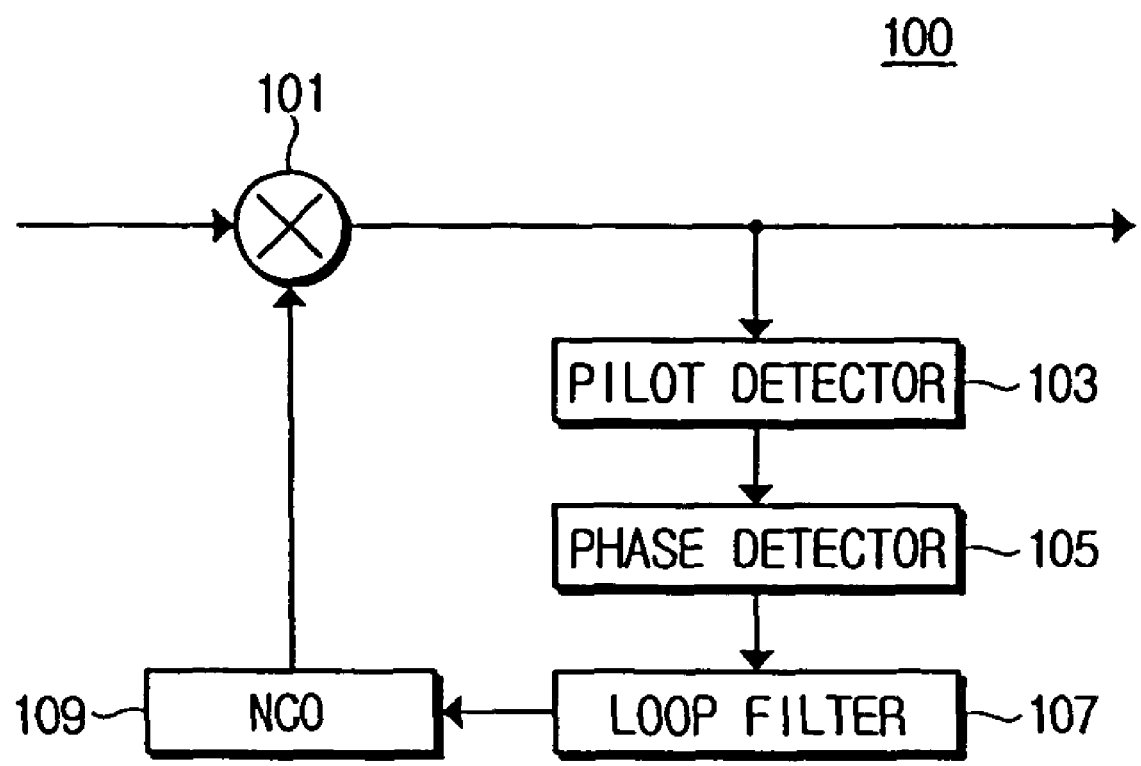
FIG. 1 is a block diagram illustrating a conventional carrier recovery circuit for pilot detection.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The carrier recovery apparatus according to an embodiment of the present general inventive concept can be installed in a receiver that receives and demodulates a VSB-modulated signal, and performs carrier recovery to minimize frequency offset and phase noise. The carrier recovery apparatus can be provided to a digital broadcast receiving system using an 8-VSB modulation method conforming with the standards of the Advanced Television System Committee (ATSC).

The carrier recovery apparatus can acquire frequency offset information not only from a conventional pilot signal, but also from upper and lower sideband signal components of a received VSB signal. Therefore, even though a received pilot signal may be corrupted due to channel characteristics, a carrier can be recovered smoothly.

Figure 2:
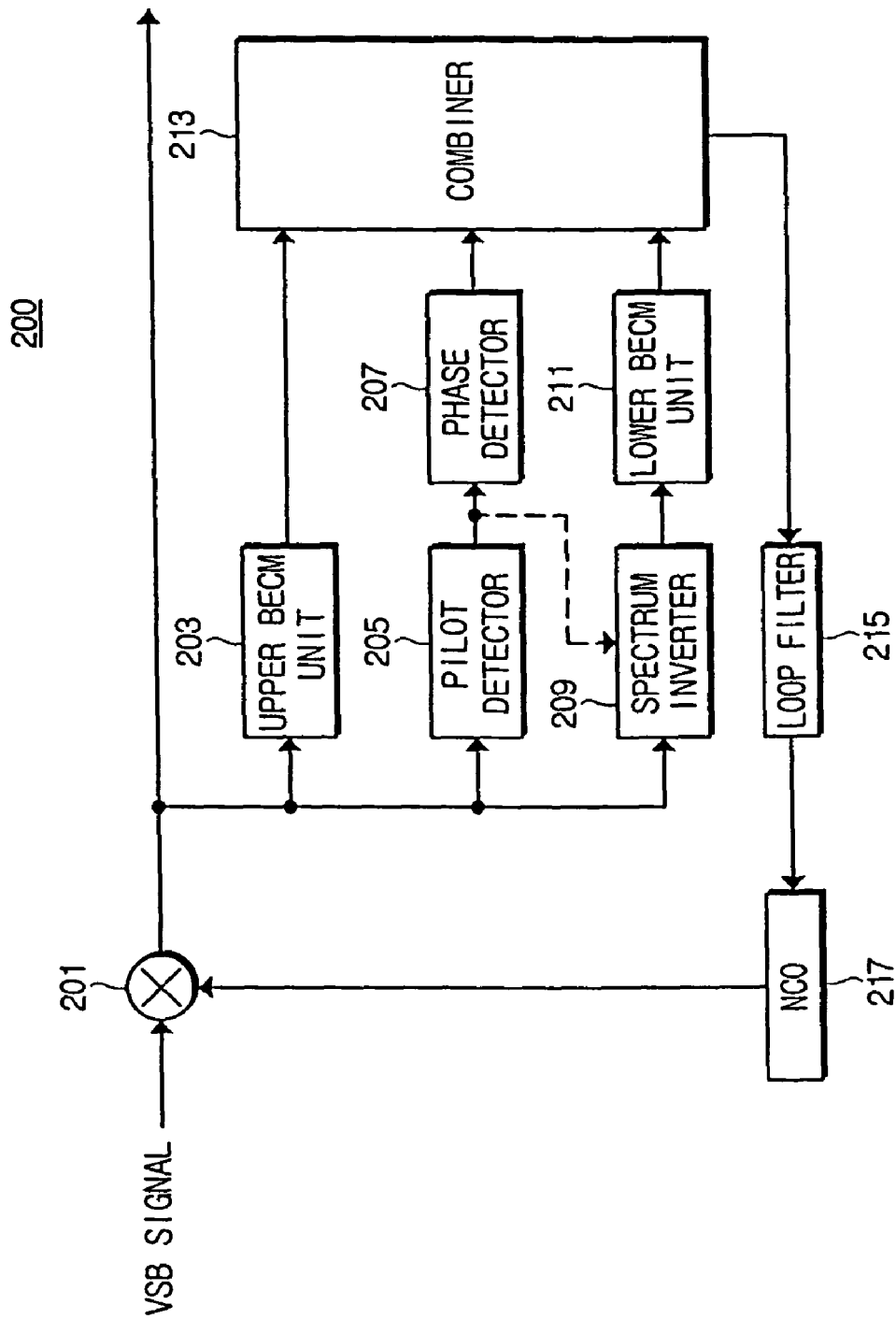
FIG. 2 is a block diagram illustrating a carrier recovery apparatus usable with a VSB receiver according to an embodiment of the present general inventive concept.

FIG. 2 is a block diagram of a carrier recovery apparatus 200 usable with a VSB receiver according to an embodiment of the present general inventive concept. Referring to FIG. 2, the carrier recovery apparatus 200 can include a multiplier 201, an upper band edge component maximization (BECM) unit 203, a pilot detector 205, a phase detector 207, a spectrum inverter 209, a lower BECM unit 211, a combiner 213, a loop filter 215, and a numerically controlled oscillator (NCO) 217.

The multiplier 201 converts a received VSB-modulated digital signal that has passed through an analog to digital converter (ADC) (not shown) to a baseband signal. That is, the multiplier 201 multiplies the VSB-modulated digital signal by a carrier signal with a predetermined frequency output from the NCO 217.

The upper BECM 203 receives the baseband signal (hereinafter, referred to as 'baseband VSB signal') output by the multiplier 201, and generates and outputs phase information (hereinafter referred to as 'upper phase information') from an upper sideband signal of the signal baseband VSB signal.

Operations of the upper BECM 203 and the lower BECM 211 are described below by comparing a frequency spectrum of the baseband VSB signal and a frequency spectrum of an inverted baseband VSB signal that has passed through the spectrum inverter 209, with reference to FIGS. 3A and 3B.

Figure 3A:
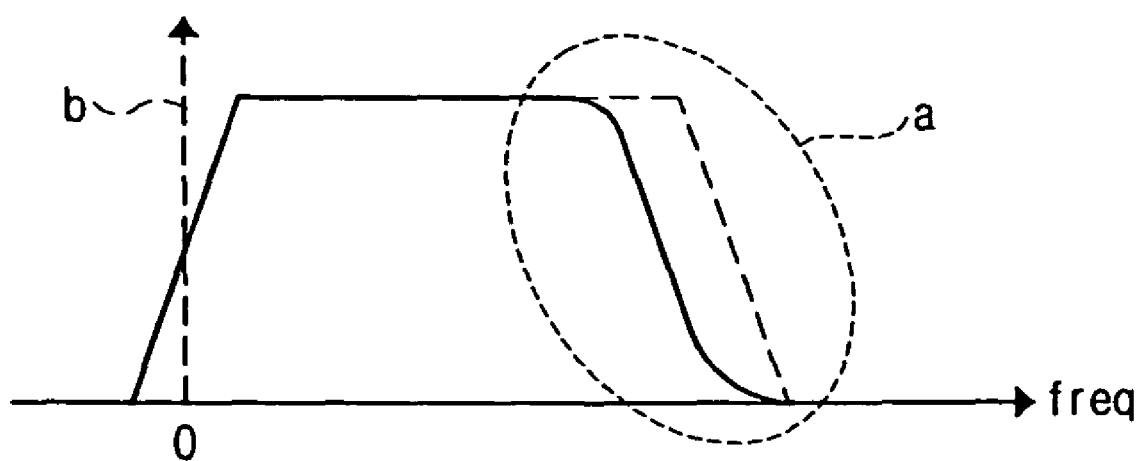
FIG. 3A and FIG. 3B are graphic illustrating frequency spectrums of a baseband VSB signal and an inverted baseband VSB signal, respectively.
Figure 3B:
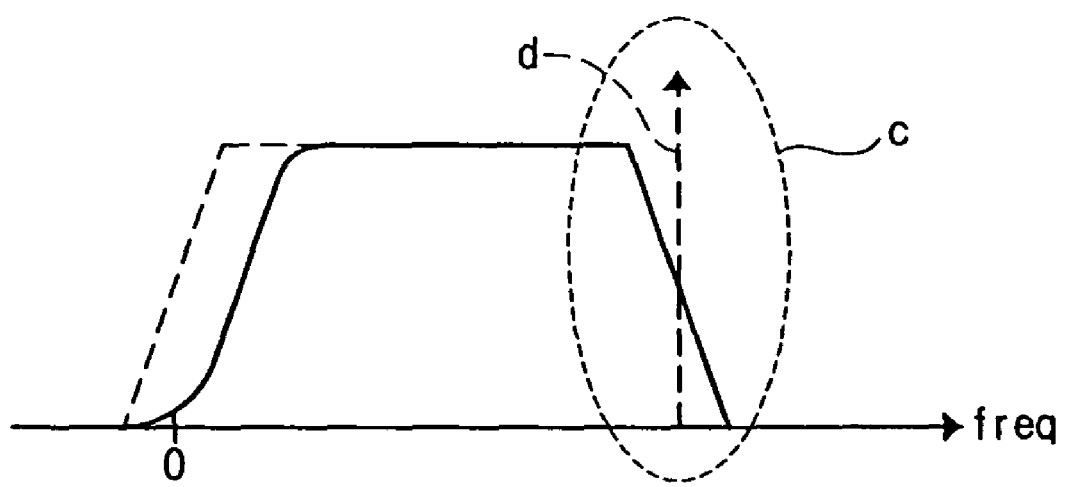

FIGS. 3A and 3B are graphs illustrating frequency spectrums of the baseband VSB signal and the inverted baseband VSB signal, respectively.

FIG. 3A graphically illustrates the frequency spectrum of the baseband VSB signal, and FIG. 3B graphically illustrates the frequency spectrum of the inverted baseband VSB signal. Referring to FIG. 3A, a reference symbol 'a' indicates an upper sideband of the baseband VSB signal, and a reference symbol 'b' indicates a pilot signal.

Comparing FIG. 3A to FIG. 3B, a lower sideband of the baseband VSB signal has shifted to an upper sideband 'c' of the inverted baseband VSB signal in FIG. 3B. Therefore, a location of the pilot signal 'b' in FIG. 3A has changed to 'd' in FIG. 3B.

In order to generate the upper phase information, the upper BECM unit 203 uses a BECM algorithm, using the upper sideband 'a' of the baseband VSB signal, as illustrated in FIG. 3A. A detailed structure of the upper BECM unit 203 and the BECM algorithm will be described below.

The spectrum inverter 209 receives the baseband VSB signal, as illustrated in FIG. 3A, and inverts the frequency spectrum of the baseband VSB signal of FIG. 3B. Accordingly, the lower sideband of the baseband VSB signal in FIG. 3A shifts to the upper sideband 'c' of the inverted baseband VSB signal in FIG. 3B, whereas the upper sideband 'a' of the baseband VSB signal in FIG. 3A shifts to a lower sideband of the inverted baseband VSB signal in FIG. 3B. The inverted baseband VSB signal is output from the spectrum inverter 209 to the lower BECM unit 211.

The spectrum inverter 209 receives the pilot signal 'b' of the baseband VSB signal from the pilot detector 205, and can remove the pilot signal 'b' from the baseband VSB signal before inverting the baseband VSB signal such that the pilot signal 'd of the inverted baseband signal is removed. Because the inverted baseband VSB signal contains the pilot signal 'd' as illustrated in FIG. 3B, the pilot signal 'd' may be removed to be free from an influence thereof.

However, the pilot signal 'd' may not be removed because phase information acquired from a signal that contains a pilot signal is more reliable than phase information acquired from a signal without a pilot signal. Accordingly, the pilot signal 'd' was not removed from the inverted baseband VSB signal output to the lower BECM unit 211, as illustrated in FIG. 3B. The following description describes a case in which the pilot signal is not removed from a baseband VSB signal.

The lower BECM unit 211 operates similarly to the upper BECM unit 203 so as to generate and output phase information (hereinafter referred to as 'lower phase information') for a carrier recovery. The upper and lower BECM units 203 and 211 may be substantially similar such that the only difference between the upper and lower BECM units 203 and 211 is that an inverted baseband VSB signal, as illustrated in FIG. 3B, is input to the lower BECM unit 211. Accordingly, the lower sideband of a baseband VSB signal is inverted to be the upper side band 'c' of the inverted baseband VSB signal input to the lower BECM unit 211.

The pilot detector 205 detects the pilot signal 'b' from the baseband VSB signal, and the phase detector 207 generates and outputs pilot phase information from the detected pilot signal 'b'.

The combiner 213 receives the upper, the lower, and the pilot phase information from the upper BECM unit 203, the lower BECM unit 211, and the phase detector 207, respectively, and multiplies the upper, lower, and phase information by first, second, and third weights (K1, K2, and K3), respectively. Then, the combiner 213 sums the multiplication results to obtain final phase information.

The first, second, and third weights (K1, K2 and K3) can vary depending on channel characteristics (or status) reflected in distortions of the pilot signal and the upper and lower sideband signals contained in the baseband VSB signal. Thus, a higher weight can be given to the lower phase information output from the lower BECM unit 211 whose reliability is relatively high because of the pilot signal. However, if the spectrum inverter 209 receives the pilot signal 'b' from the pilot detector 205, removes the pilot signal 'b' from the baseband VSB signal and inverts the frequency spectrum of the baseband VSB signal, the upper phase information and the lower phase information can be deemed to have the same level of reliability. Accordingly, the upper and lower phase information can be multiplied by the first and second weights (K1 and K2) having the same value, respectively.

To give proper weights according to channel characteristics, there are many ways to acquire information on the channel characteristics. For example, the first, second, and third weights (K1, K2 and K3) can be obtained by measuring magnitudes of the upper sideband signal 'a', the lower sideband signal 'c', and the pilot signal 'b' detected in the upper BECM unit 203, the lower BECM unit 211, and the pilot detector 205, respectively.

The loop filter 215 detects a control signal having a baseband signal component among the final phase information output from the combiner 213 and outputs the control signal to the NCO 217. The loop filter 215 can be formed of a primary loop or secondary loops, depending on whether it is desired to correct only the frequency offset of the received VSB signal or to correct the frequency and phase offset of the received VSB signal, and coefficient value thereof is changed by convergence operations.

The NCO 217 is an oscillator circuit to output a frequency corrected oscillation signal, according to the baseband component of the control signal from the loop filter 215. The frequency corrected oscillation signal output from the NCO 217 has a frequency of the recovered carrier signal, and is output to the multiplier 201 where the received VSB signal from the ADC is converted to the baseband VSB signal.

Figure 4:
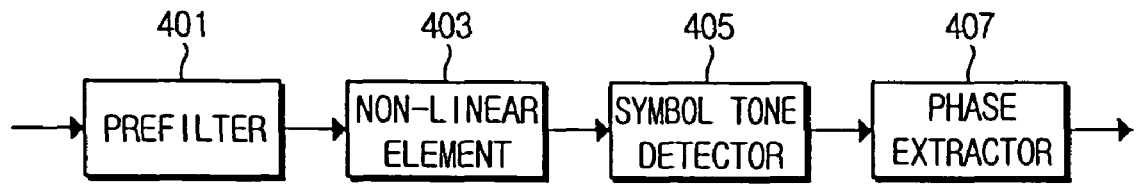
FIG. 4 is a block diagram illustrating a detailed structure of an upper and a lower band edge component maximization (BECM) unit of the carrier recovery apparatus of FIG. 2.

With reference to FIG. 4, principles of the BECM algorithm and the detailed structures of the upper and lower BECM units 203 and 211 using the BECM algorithm will now be explained.

The BECM algorithm acquires harmonic components, which are signal components of an upper sideband of a baseband VSB signal, extracts from the harmonic components a symbol tone inclusive of phase information of the baseband VSB signal, and generates phase information corresponding to a difference between the phase information of the extracted symbol tone and the phase information of a predetermined reference symbol tone. An example of the BECM algorithm is a Gardner system.

The upper BECM unit 203 uses the upper sideband 'a' signal of the baseband VSB signal, whereas the lower BECM unit 211 uses the lower sideband signal of the baseband VSB signal which is the upper sideband 'c' signal of the inverted baseband VSB signal. Since the BECM algorithm cannot use the lower sideband of the baseband VSB signal, the frequency spectrum of the VSB signal is inverted through the spectrum inverter 209 and the lower sideband shifts to the upper sideband 'c' of the inverted baseband VSB signal, and the lower BECM 211 uses the upper sideband 'c' of the inverted baseband VSB signal (see FIGS. 3A and 3B).

FIG. 4 is a block diagram illustrating the detailed structure of the upper and lower BECM units 203 and 211 of the carrier recovery apparatus 200 of FIG. 2. Referring to FIG. 4, each of the upper BECM unit 203 and the lower BECM unit 211 comprises a prefilter 401, a non-linear element 403, a symbol tone detector 405, and a phase extractor 407.

The prefilter 401 receives a baseband VSB signal and filters an upper sideband signal only. The non-linear element 403 generates the harmonic components from the upper sideband signal output from the prefilter 401. The symbol tone detector 405 extracts out of the harmonic components generated by the non-linear element 403 the symbol tone that has the same phase information as the phase information of the baseband VSB signal.

The phase extractor 407 outputs the phase information reflecting a result of the comparison between the phase information of the extracted symbol tone and the predetermined reference phase information.

According to the embodiment of FIG. 2, there are multiple ways in which the carrier recovery apparatus 200 can perform the carrier recovery. The carrier recovery apparatus 200 can recover a carrier signal using the upper phase information acquired through the upper BECM unit 203, using the pilot phase information acquired through the pilot detector 205 and the phase detector 207, and using the lower phase information acquired through the spectrum inverter 209 and the lower BECM unit 211.

Each can be done independently or together as an integrated path using the combiner 213 illustrated in FIG. 2. As described above, the combiner 213 combines the upper, lower, and pilot phase information.

According to another embodiment of the present general inventive concept, a carrier recovery apparatus can use only the upper phase information acquired from the upper BECM unit 203. Thus, the upper phase information does not go through the combiner 213, yet is used by the loop filter 215 and the NCO 217 ro recover a carrier signal.

According to another embodiment of the present general inventive concept, a carrier recovery apparatus can use only the lower phase information acquired from the spectrum inverter 209 and the lower BECM unit 211. Accordingly, the loop filter 215 and the NCO 217 can recover a carrier signal using the lower phase information.

According to another embodiment of the present general inventive concept, a carrier signal may be recovered utilizing only the upper and lower phase information from the upper and lower BECM units 203 and 211, respectively.

Furthermore, a carrier signal can be recovered by utilizing the phase information acquired through the pilot detector 205 and the phase detector 207 in addition to the upper and/or the lower phase information. In this case, the combiner 213 combines the pilot phase information with the upper and/or the lower phase information and provides the combined phase information to the loop filter 215 and the NCO 217.

Although the carrier apparatus 200 is described above as receiving a digital VSB signal, the carrier recovery apparatus 200 can alternatively receive an analog VSB signal and perform a carrier recovery operation thereto. In this case, each unit in the carrier recovery apparatus 200 can be connected via an analog circuit. For example, the NCO 217 in FIG. 2 can be replaced by an analog oscillation circuit VCXO (Voltage Controlled Crystal Oscillator).

FIG. 5 is a flow chart illustrating operations of the carrier recovery apparatus usable with a VSB receiver according to an embodiment of the present general inventive concept.

Referring to FIGS. 2-5, the multiplier 201 receives a digital VSB-modulated signal, and multiplies the received digital VSB-modulated signal by an output signal from the NCO 217 to generate a baseband VSB signal, such as the signal illustrated in FIG. 3A. The baseband VSB signal is input to the upper BECM unit 203, the pilot detector 205, and the spectrum inverter 209 (S501).

The upper BECM unit 203 performs the BECM algorithm using the upper sideband 'a' of the input baseband VSB signal, and generates the upper phase information (S503).

The pilot detector 205 detects a pilot signal 'b' from the input baseband VSB signal, and outputs the detected pilot signal 'b' to the phase detector 207 which generates the pilot phase information therefrom (S503).

The spectrum inverter 209 inverts the frequency spectrum of the input baseband VSB signal to generate the inverted baseband VSB signal, such as the signal illustrated in FIG. 3B, and outputs the inverted baseband VSB signal to the lower BECM unit 211. The lower BECM unit 211 performs the BECM algorithm using the upper sideband 'c' of the inverted baseband VSB signal, and generates the lower phase information (S503).

The combiner 213 receives the upper phase information, the lower phase information, and the pilot phase information from the upper BECM unit 203, the lower BECM unit 211 and the phase detector, respectively, and multiplies the received upper, lower, and pilot phase information by the first, second, and third weights (K1, K2 and K3), respectively. Then, the combiner 213 sums the results of the multiplications to generate the final phase information (S505).

The final phase information generated by the combiner 213 is provided to the loop filter 215, and the loop filter 215 outputs the control signal to the NCO 217. Lastly, the NCO 217, controlled by the control signal, varies the frequency of the output signal thereof to recover a carrier, and outputs the recovered carrier output signal to the multiplier 201 (S507).

The various embodiments of the present general inventive concept may be embodied as executable code in computer readable media including storage media, such as magnetic storage media (ROMs, RAMs, floppy disks, magnetic tapes, etc.), and optically readable media (CD-ROMs, DVDs, etc.), and transmissions over the Internet.

As described above, a carrier recovery apparatus according to the embodiment of the present general inventive concept extracts phase information not only from a pilot signal, but also from upper and lower sidebands of a received VSB signal to recover a carrier. Therefore, even though a pilot signal may be corrupted by multipath channel characteristics, a carrier recovery apparatus, according to the embodiments of the general inventive concept is capable of performing carrier recovery. Moreover, because both an upper sideband and a lower sideband can be used for a BECM algorithm, it is possible to recover the carrier even when the upper sideband of a received signal is corrupted. Furthermore, a carrier recovery apparatus, according to the embodiments of the general inventive concept can successfully prevent deteriorations in data receiving performance caused by pilot signal corruption and failure in a carrier recovery.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A carrier recovery apparatus, comprising:
   a multiplier to receive a vestigial side band (VSB)-modulated signal and to multiply the received VSB-modulate signal with a carrier signal to generate a baseband VSB signal;
   an upper sideband detecting unit to detect an upper sideband of the baseband VSB signal and to generate upper phase information corresponding to the detected upper sideband;
   a lower sideband detecting unit to detect a lower sideband of the baseband VSB signal and to generate lower phase information corresponding to the detected lower sideband;
   a carrier signal adjustment unit to adjust the carrier signal according to the upper and lower phase information and to output the adjusted carrier signal to the multiplier; and
   a pilot detecting unit to detect a pilot signal of the baseband VSB signal and to generate pilot phase information corresponding to the detected pilot signal, wherein the carrier signal adjustment unit adjusts the carrier signal according to the upper phase information, the lower phase information, and the pilot phase information,
   wherein the upper phase information and the lower phase information are capable of recovering the carrier signal.

2. The carrier recovery apparatus according to claim 1, wherein the upper sideband detection unit comprises a first band edge component maximization (BECM) unit to detect the upper sideband of the baseband VSB signal and to generate the upper phase information therefrom, and the lower sideband detecting unit comprises a spectrum inverter to invert the baseband VSB signal, and a second BECM unit to detect an upper sideband of the inverted VSB signal and to generate the lower phase information therefrom.

3. The carrier recovery apparatus according to claim 1, wherein the carrier signal adjustment unit comprises:
   a combiner to assign weights to the upper and lower phase information according to reliabilities thereof, and to combine the upper and lower phase information according to the assigned weights;
   a loop filter to filter the combined upper and lower phase information to generate a control signal; and
   an oscillation unit to output the carrier signal to the multiplier according to the generated control signal.

4. A carrier recovery method, comprising:
   multiplying a received vestigial side band (VSB)-modulated signal with a carrier signal to generate a baseband VSB signal;
   detecting an upper sideband of the VSB baseband signal and generating upper phase information corresponding to the detected upper sideband;
   detecting a lower sideband of the VSB baseband signal and generating lower phase information corresponding to the detected lower sideband;
   adjusting the carrier signal according to the generated upper and lower phase information; and
   detecting a pilot signal of the baseband VSB signal and generating pilot phase information corresponding to the detected pilot signal, where the carrier signal is adjusted according to the upper phase information, the lower phase information, and the pilot phase information,
   wherein the upper phase information and the lower phase information are capable of recovering the carrier signal.

5. The carrier recovery method according to claim 4, wherein the detecting of the lower sideband of the VSB baseband signal comprises:
   inverting the VSB baseband signal; and
   detecting an upper sideband of the inverted VSB baseband signal.

6. The carrier recovery apparatus according to claim 4, wherein the adjusting of the carrier signal comprises:
   weighting the generated upper and lower phase information according to reliabilities thereof and combining the weighted upper and lower phase information;
   filtering the combined upper and lower phase information to generate a control signal; and
   adjusting the carrier signal according to the generated control signal.

7. A non-transitory computer readable storage medium including executable codes to perform a carrier recovery method, the method comprising:
   multiplying a received vestigial side band (VSB)-modulated signal with a carrier signal to generate a baseband VSB signal;
   detecting an upper sideband of the VSB baseband signal and generating upper phase information corresponding to the detected upper sideband;
   detecting a lower sideband of the VSB baseband signal and generating lower phase information corresponding to the detected lower sideband;
   adjusting the carrier signal according to the generated upper and lower sidebands; and detecting a pilot signal of the baseband VSB signal and generating pilot phase information corresponding to the detected pilot signal, where the carrier signal is adjusted according to the upper phase information, the lower phase information, and the pilot phase information;

wherein the upper phase information and the lower phase information are capable of recovering the carrier signal.

8. A carrier recovery method, comprising:

multiplying a received vestigial side band (VSB)-modulated signal with a carrier signal to generate a baseband VSB signal;

detecting at least two portions of the VSB baseband signal and generating at least two phase information corresponding to the detected portion;

adjusting the carrier signal according to the generated at least two phase information; and detecting a pilot signal of the baseband VSB signal and generating pilot phase information corresponding to the detected pilot signal, where the carrier signal is adjusted according to the at least two phase information and the pilot phase information, wherein the at least two phase information are capable of recovering the carrier signal.

* * * * *